(12) United States Patent
Gerber et al.

(10) Patent No.: US 8,959,243 B2
(45) Date of Patent: Feb. 17, 2015

(54) SYSTEM AND METHOD TO GUIDE ACTIVE PARTICIPATION IN PEER-TO-PEER SYSTEMS WITH PASSIVE MONITORING ENVIRONMENT

(75) Inventors: Alexandre Gerber, Madison, NJ (US); Oliver Spatscheck, Randolph, NJ (US); Subhabrata Sen, New Providence, NJ (US); Ajay Todimala, Madison, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 235 days.

(21) Appl. No.: 12/325,703

(22) Filed: Dec. 1, 2008

(65) Prior Publication Data
US 2010/0138555 A1 Jun. 3, 2010

(51) Int. Cl.
*G06F 15/16* (2006.01)
*H04L 12/66* (2006.01)
(52) U.S. Cl.
CPC ...................................... *H04L 12/66* (2013.01)
USPC .......................................... 709/232; 709/230
(58) Field of Classification Search
CPC ....................................................... H04L 47/10
USPC ................................................. 709/232, 230
See application file for complete search history.

(56) References Cited

U.S. PATENT DOCUMENTS

| | | | |
|---|---|---|---|
| 6,012,096 A | 1/2000 | Link et al. | |
| 6,167,432 A | 12/2000 | Jiang | |
| 6,711,615 B2 | 3/2004 | Porras et al. | |
| 7,065,579 B2 | 6/2006 | Traversat et al. | |
| 7,069,318 B2 | 6/2006 | Burbeck et al. | |
| 2002/0138471 A1 | 9/2002 | Dutta et al. | |
| 2003/0196148 A1 | 10/2003 | Harrisville-Wolff et al. | |
| 2005/0086062 A1 | 4/2005 | Clark et al. | |
| 2006/0184454 A1 | 8/2006 | Ananda | |
| 2006/0184688 A1 | 8/2006 | Ganguly et al. | |
| 2007/0064702 A1 | 3/2007 | Bates et al. | |
| 2007/0136370 A1 | 6/2007 | Frieder et al. | |
| 2008/0005336 A1 | 1/2008 | Cohen et al. | |
| 2008/0009272 A1* | 1/2008 | Toledano | 455/414.1 |
| 2008/0235331 A1* | 9/2008 | Melamed et al. | 709/204 |
| 2008/0281950 A1* | 11/2008 | Wald et al. | 709/223 |
| 2009/0168648 A1* | 7/2009 | Labovitz et al. | 370/229 |
| 2010/0005171 A1* | 1/2010 | Arolovitch | 709/225 |

* cited by examiner

*Primary Examiner* — Dustin Nguyen
*Assistant Examiner* — Joel Mesa
(74) *Attorney, Agent, or Firm* — Akerman LLP; Michael K. Dixon; Roy P. Zachariah (57) ABSTRACT

A method includes identifying shared content by inspecting a peer-to-peer traffic flow and identifying source peers providing the shared content, and requesting the shared content from the source peers. The method further includes receiving requests for the shared content from requesting peers, identifying requesting peers based on the requests for the shared content, and providing the shared content to a local subset of the requesting peers.

16 Claims, 6 Drawing Sheets

SYSTEM AND METHOD TO GUIDE ACTIVE PARTICIPATION IN PEER-TO-PEER SYSTEMS WITH PASSIVE MONITORING ENVIRONMENT

FIELD OF THE DISCLOSURE

The present disclosure generally relates to communications networks, and more particularly relates to systems and methods to guide active participation in peer-to-peer systems with passive monitoring.

BACKGROUND

Peer-to-peer (P2P) networks use diverse connectivity between participants in a network and the cumulative bandwidth of network participants, rather than conventional centralized resources where a relatively low number of servers provide a service or application. A pure P2P network does not have traditional clients or servers, but only equal peer nodes that simultaneously function as both "clients" and "servers" to the other nodes on the network.

P2P networks can be useful for sharing content files containing audio, video, or other data in digital format. It is estimated that P2P file sharing, such as BitTorrent, represents greater than 20% of all broadband traffic on the Internet.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
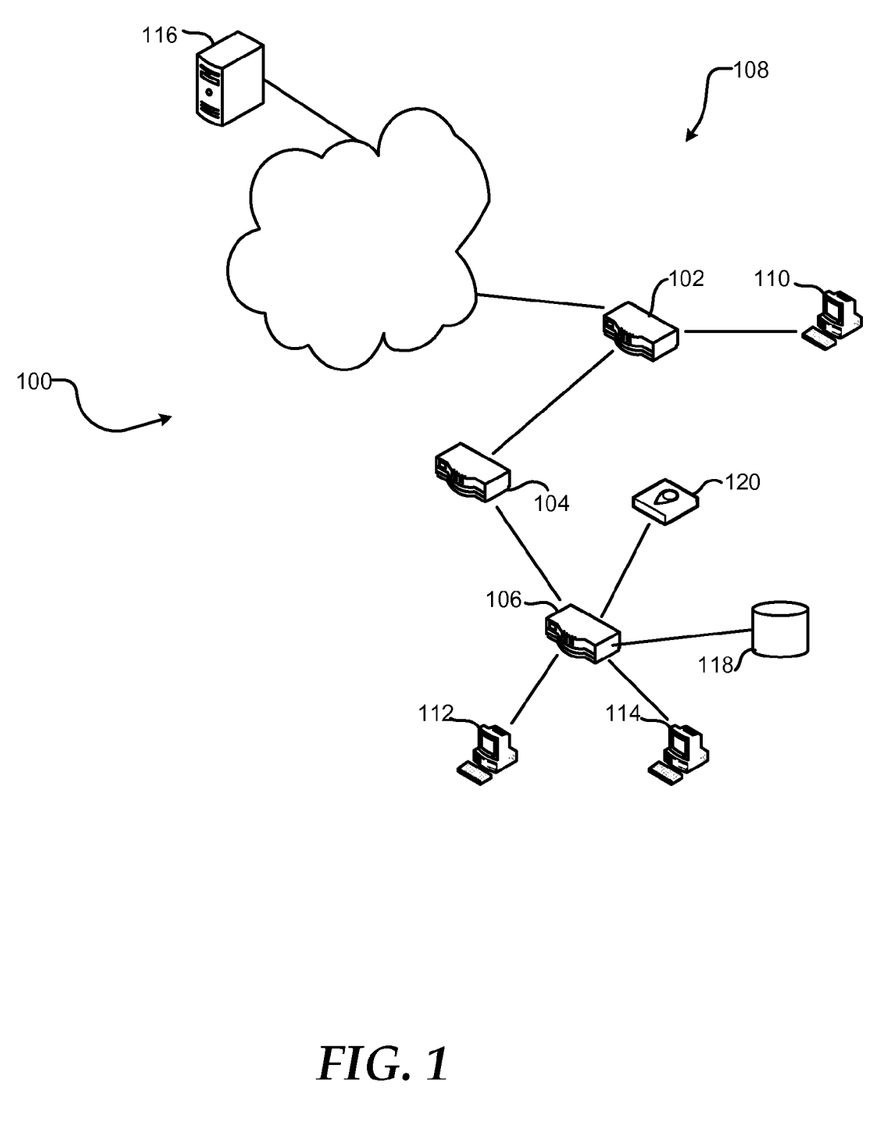
FIG. 1 is a block diagram illustrating a communications network in accordance with one embodiment of the present disclosure.

FIG. 1 shows a communications network 100, such as the Internet. Communications network 100 can include routers 102, 104, and 106 that communicate with each other and form an autonomous system (AS) 108. AS 108 can connect to other ASs that form network 100 through a peering point at router 102. Additionally, AS 108 can include peer systems 110, 112, and 114 connected to respective routers 102 and 106 to access the network 100. Router 102 can provide ingress and egress for peer system 110. Router 106 can provide ingress and egress for both of peer systems 112 and 114. Peer systems 110, 112, and 114 can form a P2P file-sharing network. In a P2P file-sharing network, for example, peer system 112 can request a data file from peer system 110. When peer system 110 has the data file, peer system can provide the data file to peer system 112.

In an embodiment, communications network 100 can include an originating server 116, a monitoring node 118, and a participating server 120. Peer system 110 can receive content from originating server 116 or other sources, and make the content available to peer systems 112 and 114 through the P2P network. For example, peer system 112 can request the content from peer system 110, and peer system 110 can provide the content to peer system 112. Monitoring node 118 can inspect file-sharing traffic from a subset of peer systems such as peer systems 112 and 114, and may identify the content requested by peer system 112. In an embodiment, deep packet inspection can be used to identify the content of the data file being shared between peer systems. Additionally, participating server 120 can participate in the P2P file-sharing network. After the monitoring node 118 has identified the content being shared through the P2P file-sharing network, participating server 120 can download the content from peer systems currently providing the content such as peer system 110, from the originating server 116, or from other sources of the content. The participating server 120 can make the content available to other peer systems such as peer systems 112 and 114.

In an embodiment, providing the content from a server closer to the requesting peer systems can reduce network costs. Additionally, participating server 120 can gather information about the peer systems sharing the content, such as the identity of the peer systems, the distribution of peers providing the content, the distribution of peers requesting the content, and the like. For example, the information can be used to optimize the P2P file sharing, improve network performance, decrease network costs, or track the propagation of files through the P2P network.

Figure 2:
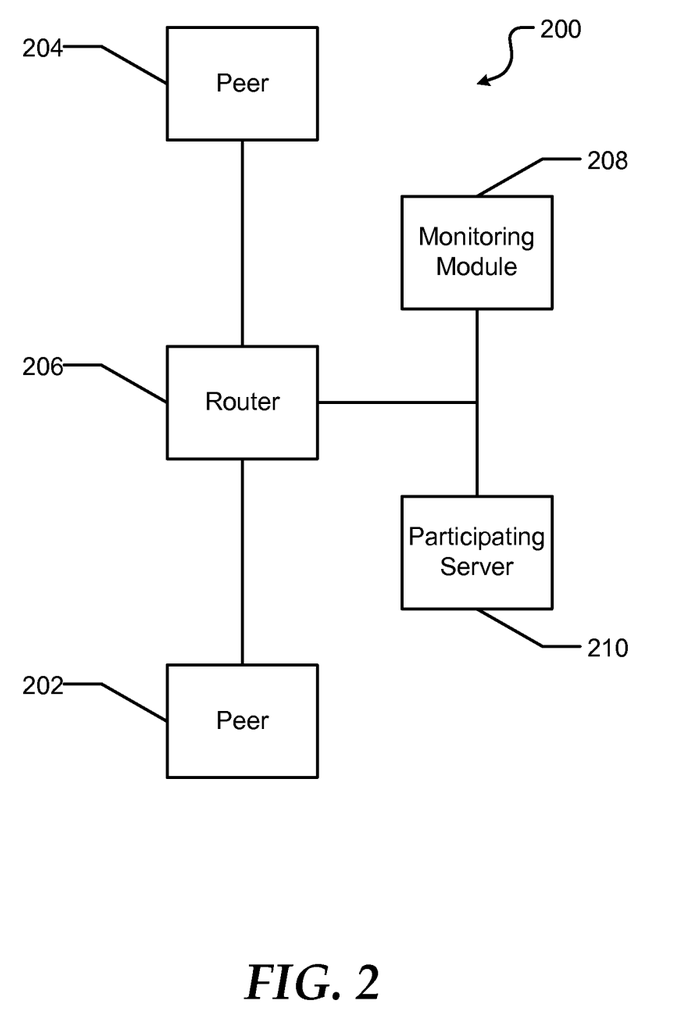
FIG. 2 is a block diagram illustrating a P2P system in accordance with one embodiment of the present disclosure.

FIG. 2 illustrates a P2P system 200 for monitoring and actively participating in P2P distribution of data files. Peer 202 can communicate with peer 204 through a router 206. Peers 202 and 204 can be client system, such as client system 112. Router 206 can be similar to router 106. In an embodiment, communication between peer 202 and peer 204 may travel through multiple routers. Further, P2P system 200 can include a monitoring module 208 and a participating server 210. Monitoring module 208 and participating server 210 can be implemented in hardware, software, or any combination thereof. Additionally, monitoring module 208 and participating server 210 can be implemented on the same physical or virtual machine, separate virtual or physical machines at the same location, or separate physical machines at different locations in the network. Further, the monitoring module 208 or the participating server 210 may be implemented as a component of router 206.

Monitoring module 208 can passively monitor traffic through router 206. Monitoring module 208 can use packet inspection techniques to identify the port numbers and Internet Protocol (IP) address for peers 202 and 204. Monitoring module 208 may identify P2P traffic based on destination or source port number, protocol analysis, other means known in the art, or any combination thereof. Additionally, analysis of the content of the packet or packets can be used to identify the content of the data file being distributed. Monitoring module 208 can use the information gathered by inspecting the P2P traffic to identify of the content being shared. High impact content can be content that utilizes a significant amount of network capacity, such as large files that are repeatedly transferred, files that are repeatedly transferred between subnets, and popular content that is frequently transmitted. In an alternate embodiment, specific content may be identified. For example, a content owner may provide a list of content licensed for active participation or a list of content not licensed for distribution.

Participating server 210 can actively participate in P2P distribution of the high-impact content. Participating server 210 can identify peers that have the content available. For example, the participating server 210 may request the content from peer 204. In another example, the BitTorrent protocol may be used for transferring the data file and the participating server 210 may connect to a tracker to receive a list of peers currently transferring pieces of the data file. Additionally, the participating server 210 can make the content available for download, such as by serving requests for the content to peer 202, or by notifying the tracker that the participating server 210 has pieces of the data file to transfer. Further, the participating server 210 may maintain a list of the IP addresses of peers providing the high-impact content and peers requesting the high-impact content. In an embodiment, the participating server 210 may refuse to serve a request from a peer for excluded content. In another embodiment, content distribution information, such as the number of peers requesting the content, the distribution of the peers having the content, the identity of the peers participating in the distribution of the content, and the like, may be used to distribute the shared content across multiple participating servers 210 throughout the network, such as to minimize network costs. The content distribution information may also be provided to the content owner, such as for accounting and billing purposes.

Figure 3:
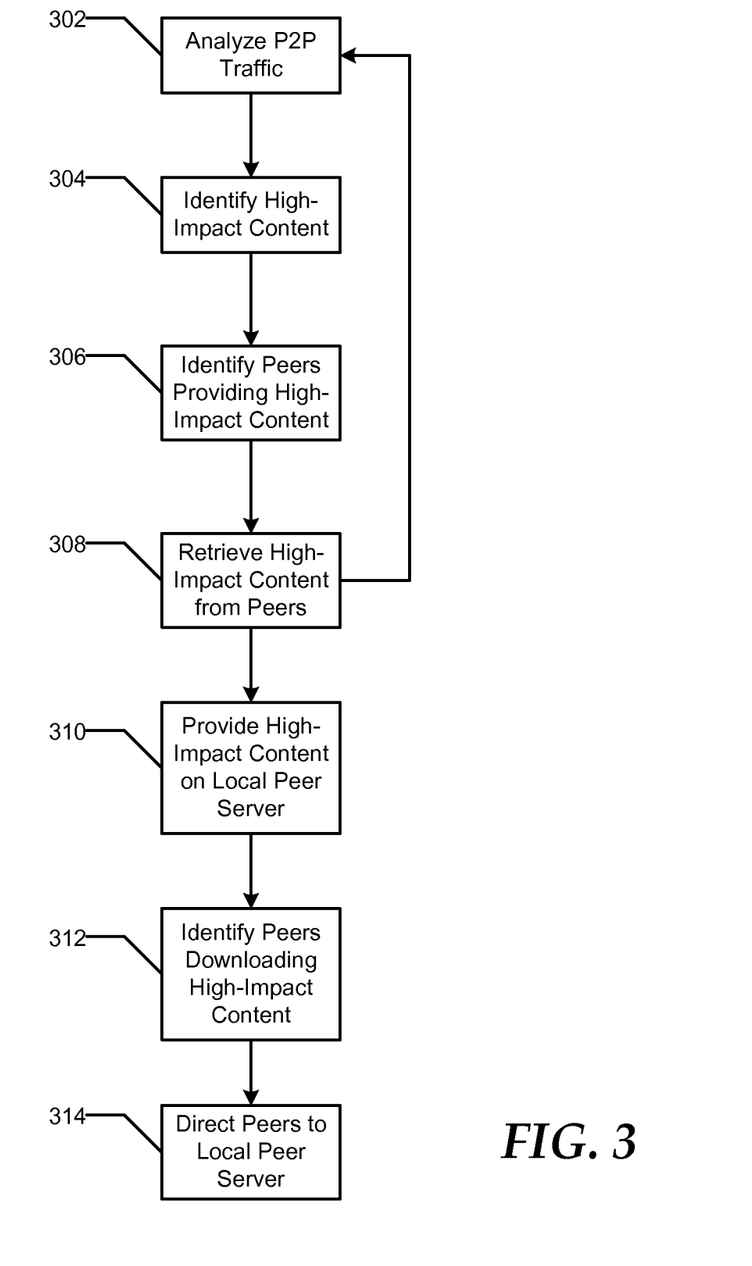
FIG. 3 is a flow diagram illustrating an exemplary method for participating in a P2P network in accordance with one embodiment of the present disclosure.

FIG. 3 shows a flow diagram illustrating a method for P2P distribution of high-impact content. At 302, P2P traffic may be analyzed, such as by monitoring module 208. The analysis of the P2P traffic can include determining the peers involved in the distribution of the content, the identity of the content, the size of the content, the impact of the distribution of the content on the network, and the like. At 304, high-impact content can be identified. High-impact content can include content having a significant effect on network resources, such as through heavy sharing, significant sharing across sub-networks, sharing large files, and the like. In an embodiment, high-impact content can include content licensed for active participation, excluded content, or any combination thereof.

At 306, peers providing the high-impact content can be identified. For example, peers providing the high-impact content can be identified, such as based on an IP address. The peers may be identified as a potential source for retrieving the high impact content. At 308, the high-impact content can be retrieved from the identified peers. Alternatively, requests for the high-impact content can be sent to a number of peers. The peers may be selected based on the network costs associated with receiving the content from the peers. Additionally, peers responding to the request with the high-impact content can be identified as peers providing the high-impact content. At 302, additional P2P traffic can be analyzed.

At 310, the high-impact content can be provided on a local peer server, such as participating server 210. The local peer server may provide the content to peers within the same subnet more efficiently than a peer in another subnet. As such, providing the high-impact content on the local peer server can reduce network usage and decrease the time required for the peer to download the content. At 312, peers downloading the high-impact content can be identified. For example, peers downloading the high-impact content can be identified based on the IP address. At 314, peers downloading the high-impact content from a non-local source can be directed to the local peer server to reduce the time for retrieving the content and to reduce the impact on the network. For example, the connection to the local peer server may be more reliable than the connection to a non-local peer, and downloading peers may preferably request content from the local peer server. In an embodiment, peers can be identified based on the requests for content from the local peer server. In another embodiment, peers requesting content from a non-local peer, or peers currently downloading content from a non-local peer, may be redirected, such as by a router, to the local peer. In yet another embodiment, connections to non-local peers for retrieving high-impact content available on the local peer server may be limited to reduce network impact and encourage retrieving the content from the local peer server.

Figure 4:
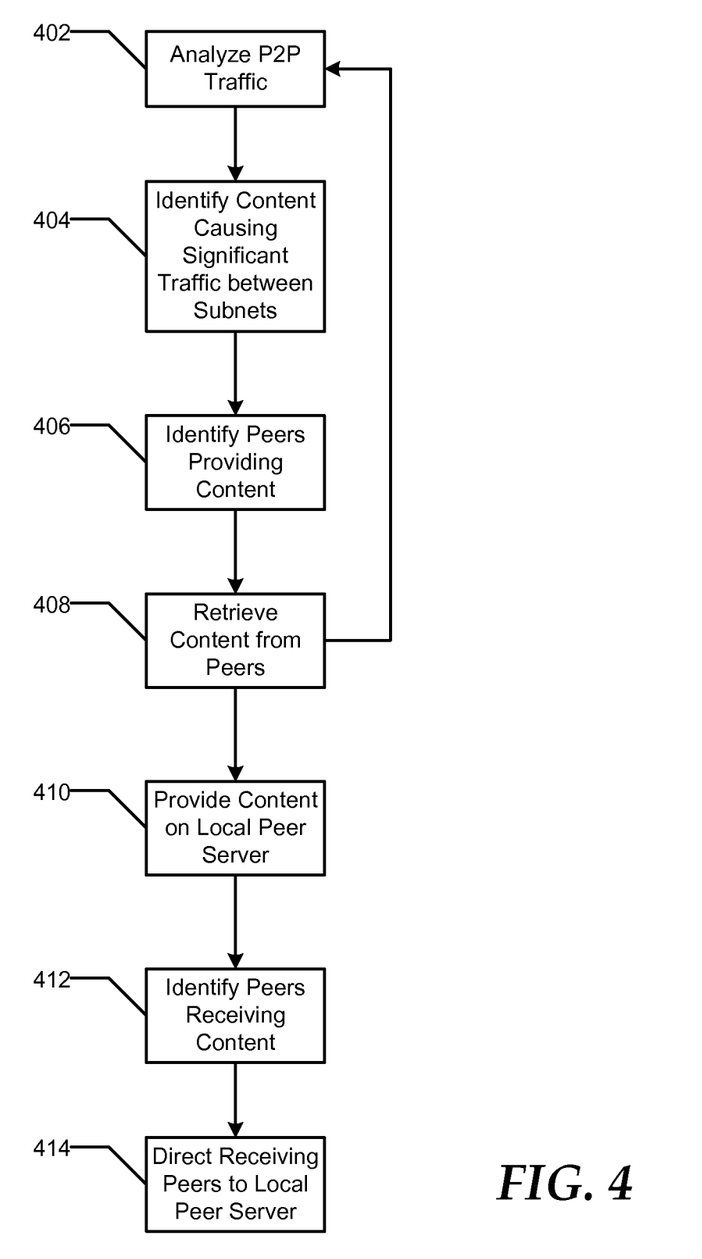
FIG. 4 is a flow diagram illustrating an exemplary method for participating in a P2P network in accordance with another embodiment of the present disclosure.

FIG. 4 shows a flow diagram illustrating an alternative method for P2P distribution of content. At 402, P2P traffic may be analyzed, such as by monitoring module 208. The analysis of the P2P traffic can include determining the peers involved in the distribution of the content, the identity of the content, the size of the content, the impact of the distribution of the content on the network, and the like. At 404, content causing significant traffic between subnets can be identified. For example, when peers providing the content are generally located in a separate subnet from peers requesting the content, the traffic between the subnets can be significant. In an embodiment, the content can include content licensed for active participation, excluded content, or any combination thereof.

At 406, peers providing the content can be identified as a potential source for retrieving the content. For example, the IP address of peers providing the content can be identified. Additionally, the location within the network can be determined based on the IP address of the peer and the topology of the network. At 408, the content can be retrieved from the identified peers. Alternatively, requests for the content can be sent to a number of peers. Peers responding to the request with the content can be identified as peers providing the content. In an embodiment, a local peer server located close to requesting peers can retrieve the content from the serving peer. Alternatively, retrieving the content from another peer server may be more efficient than retrieving from the serving peer.

At 410, the content can be provided on a local peer server, such as participating server 210. The local peer server may provide the content to peers within the same subnet more efficiently than can a peer in another subnet. As such, providing the content on the local peer server can reduce network usage and decrease the time required for the peer to download the content. At 412, peers downloading the content can be identified. For example, the IP addresses for peers downloading the content can be determined. At 414, peers downloading the content from a non-local source can be directed to the local peer server to reduce the time for retrieving the content and to reduce the impact on the network. For example, the connection to the local peer server may be more reliable than the connection to a non-local peer, and downloading peers may preferably request content from the local peer server. In an embodiment, peers can be identified based on the requests for content from the local peer server.

Figure 5:
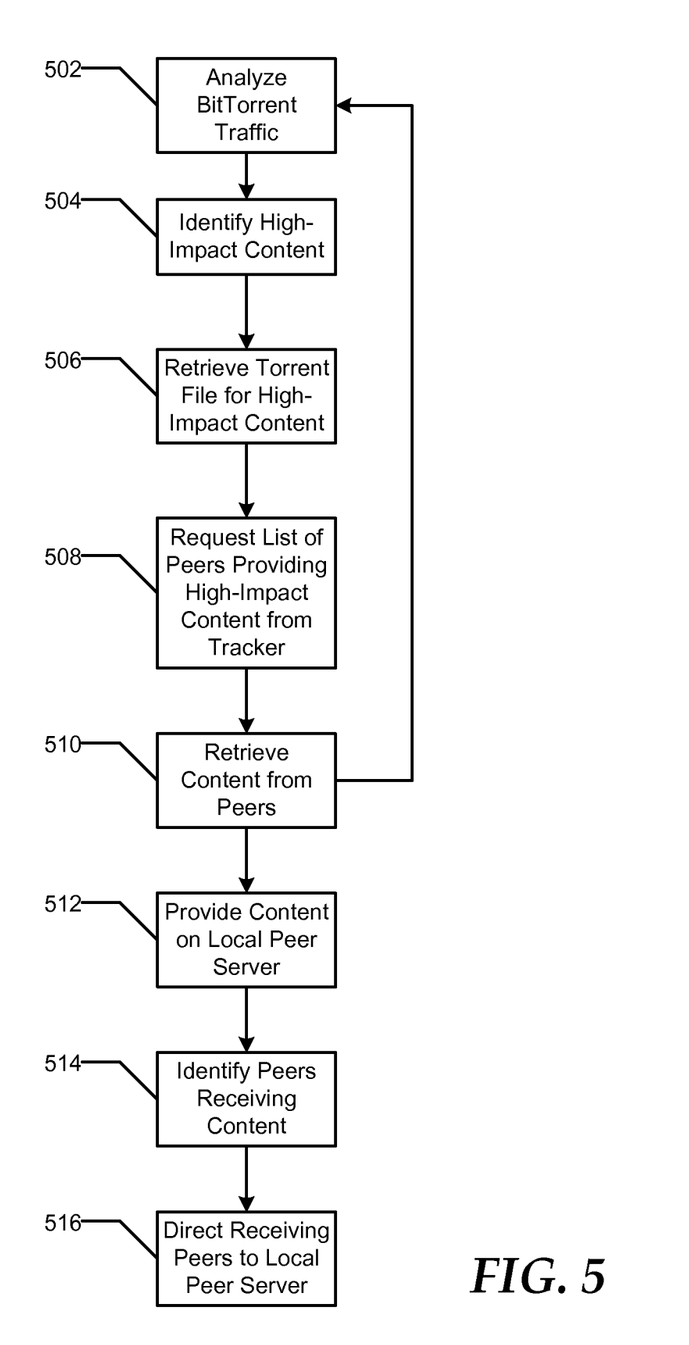
FIG. 5 is a flow diagram illustrating an exemplary method for participating in a P2P network in accordance with yet another embodiment of the present disclosure.

FIG. 5 shows a flow diagram illustrating another embodiment of the method for P2P distribution of high-impact content. At 502, BitTorrent traffic may be analyzed, such as by monitoring module 208. The analysis of the BitTorrent traffic can include determining the peers involved in the distribution of the content, the identity of the content, the size of the content, the impact of the distribution of the content on the network, and the like. At 504, high-impact content can be identified. At 506, a torrent file for the high-impact content can be retrieved. The torrent file can include the identity of a tracker or trackers maintaining a list of peers currently transferring pieces of the data file. At 508, the list of peers can be retrieved from the tracker. At 510, the high-impact content can be retrieved from the peers identified in the list. In an embodiment, pieces of the data file may be preferentially retrieved from peers closer in the network or peers having a lower network cost. At 502, additional P2P traffic can be analyzed.

At 510, the high-impact content can be provided on a local peer server, such as participating server 210. The local peer server may provide the content to peers within the same subnet more efficiently than a peer in another subnet. As such, providing the high-impact content on the local peer server can reduce network usage and decrease the time required for the peer to download the content. The local peer server may notify the tracker that the local peer server has the high-impact content available for downloading. At 512, peers downloading the high-impact content can be identified. For example, the IP addresses of peers downloading the high-impact content can be determined. Additionally, the location of the peers can be determined based on the IP address. At 514, peers downloading the high-impact content from a non-local source can be directed to the local peer server to reduce the time for retrieving the content and to reduce the impact on the network. In an embodiment, content requests from non-local peers to the local peer server may be refused.

Figure 6:
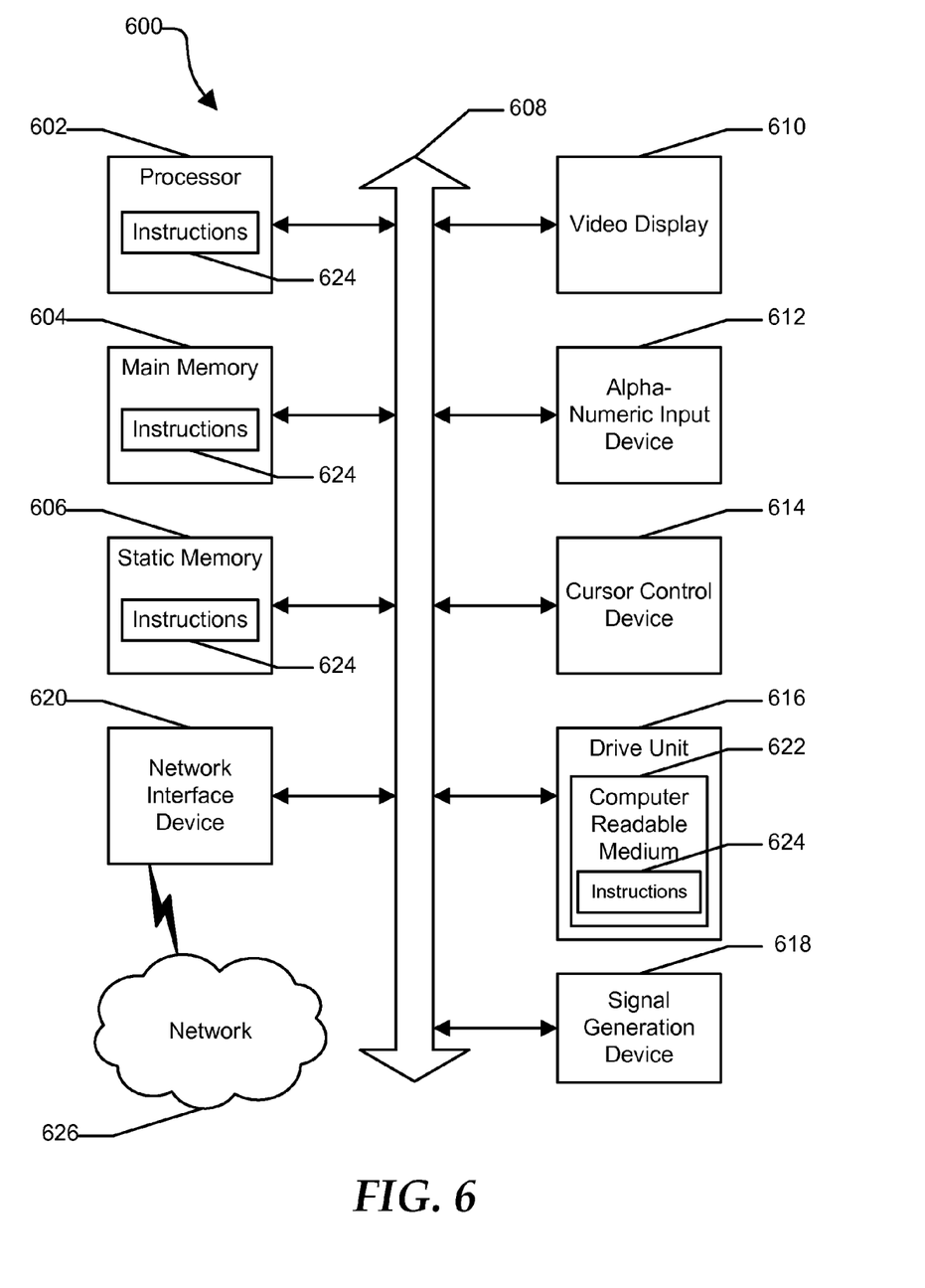
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a P2P (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid-state display, or a cathode ray tube (CRT). Additionally, the computer system 600 may include an input device 612 such as a keyboard, and a cursor control device 614 such as a mouse. Alternatively, input device 612 and cursor control device 614 can be combined in a touchpad or touch sensitive screen. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A computer implemented method comprising:
identifying, by utilizing instructions from memory that are executed by a processor, a plurality of shared content items by inspecting peer-to-peer traffic flow using deep packet inspection;
selecting, by utilizing the processor, one of the shared content items based on inspecting the peer-to-peer traffic flow, wherein the one shared content item is selected when the one shared content item is popular shared content, is content having a significant effect on network resources, and is content with a large file size that is repeatedly transferred, and wherein the one shared content item is selected by being in a list of content licensed for active participation;
identifying, by utilizing the processor, a source peer providing the one shared content item;
downloading the one shared content item at a peer server from the source peer;
adding, by utilizing the processor, the peer server to a list of peers currently transferring portions of the one shared content item, wherein the one shared content item includes an identity of a tracker including the list of peers currently transferring portions of the one shared content item;
transmitting, by utilizing the processor, a notification to the tracker that the peer server has the one shared content item available for downloading;
redirecting, by utilizing the processor, a request for the one shared content item to the peer server, wherein the request is made by a requesting peer of a plurality of requesting peers and the request is redirected to the peer server based on the peer server being in the list of peers currently transferring the portions of the one shared content item;
identifying, by utilizing the processor, the requesting peer based on the request for the one shared content item; and
providing the one shared content item from the peer server to a subset of the plurality of requesting peers in a same subnet as the peer server.

2. The method of claim 1, wherein the subset of the plurality of requesting peers is determined based on a network topology.

3. A computer implemented method comprising:
identifying, by utilizing instructions from memory that are utilized by a processor, a plurality of shared content items by inspecting peer-to-peer traffic flow;
selecting, by utilizing the processor, one of the shared content items based on inspecting the peer-to-peer traffic flow, wherein the one shared content item is selected when the one shared content item is popular shared content, is content having a significant effect on network resources, and is content with a large file size that is repeatedly transferred, and wherein the one shared content item is selected by being in a list of content licensed for active participation;
identifying, by utilizing the processor, a source peer providing the one shared content item, wherein the one shared content item includes an identity of a tracker including a list of peers currently transferring portions of the one shared content item;
downloading the one shared content item at a peer server from the source peer based on network costs associated with receiving the one shared content item from the source peer;
transmitting, by utilizing the processor, a notification to the tracker that the peer server has the one shared content item available for downloading;
receiving a request for the one shared content item at the peer server from a requesting peer, wherein the request is received by the peer server based on the peer server being in a list of peers currently transferring portions of the one shared content item; and
identifying, by utilizing the processor, the requesting peer based on the request for the one shared content item.

4. The method of claim 3, further comprising providing the one shared content item to the requesting peer.

5. The method of claim 3, wherein the one shared content item is excluded content.

6. A method comprising:
inspecting, by utilizing instructions from memory that are executed by a processor, peer-to-peer traffic of participating peers using deep packet inspection to identify a plurality of shared content items;
selecting, by utilizing the processor, one of the shared content items based on inspecting the peer-to-peer traffic, wherein the one shared content item is selected when the one shared content item is popular shared content, is content having a significant effect on network resources, and is content with a large file size that is repeatedly transferred, and wherein the one shared content item is selected by being in a list of content licensed for active participation;
identifying, by utilizing the processor, source peers having the one shared content item, the source peers being different than the participating peers;
downloading, at a server, the one shared content item from the source peers;
providing the one shared content item;
adding, by utilizing the processor, the server to a list of peers currently transferring portions of the one shared content item, wherein the one shared content item includes an identity of a tracker including the list of peers currently transferring portions of the one shared content item;
transmitting, by utilizing the processor, a notification to the tracker that a peer server has the one shared content item available for downloading;
identifying, by utilizing the processor, a requesting peer other than the participating peers requesting the one shared content item and the server being on the list of peers; and
redirecting, by utilizing the processor, the requesting peer to the server for the one shared content item based on the server being in the list of peers currently transferring the portions of one shared content item.

7. The method of claim 6, wherein the one shared content item is provided to the requesting peer.

8. The method of claim 6, wherein the one shared content item matches a list of content provided by a content owner.

9. A computer implemented method comprising:
inspecting, by utilizing instructions from memory that are executed by a processor, peer-to-peer traffic of participating peers to identify a plurality of shared content items;
selecting, by utilizing the processor, one of the shared content items based on inspecting the peer-to-peer traffic, wherein the shared content item is selected when the shared content item is popular shared content, is content having a significant effect on network resources, and is content with a large file size that is repeatedly transferred, and wherein the shared content item is selected by being in a list of content licensed for active participation;

identifying, by utilizing the processor, source peers providing the one shared content item, the source peers being different than the participating peers, wherein the one shared content item includes an identity of a tracker including a list of peers currently transferring portions of the one shared content item;

transmitting, by utilizing the processor, a notification to the tracker that a peer server has the one shared content item available for downloading;

selecting, by utilizing the processor, a peer other than the participating peers based on network costs associated with receiving the one shared content item from the peer;

sending, by utilizing the processor, a request for the one shared content item to the peer other than the participating peers, wherein the request is sent to the peer other than the participating peers based on the peer other than the participating peers being in the list of peers currently transferring portions of the one shared content item;

receiving a response to the request; and obtaining, by utilizing the processor, source information about one of the source peers providing the one shared content item based on the response.

10. The method of claim 9, wherein the source information includes one of a location of the source peer, an identity of the source peer, and any combination thereof.

11. The method of claim 9, further comprising determining content distribution information for the one shared content item, wherein the content distribution information includes a distribution of one of a plurality of source peers, internet protocol addresses of the plurality of source peers, location of the plurality of source peers, and any combination thereof.

12. The method of claim 9, wherein the one shared content item matches a list of content provided by a content owner.

13. A computer implemented method comprising:

inspecting, by utilizing instructions from memory that are executed by a processor, peer-to-peer traffic of participating peers;

identifying, by utilizing the processor, a plurality of shared content items based on inspecting peer-to-peer traffic;

selecting, by utilizing the processor, one of the shared content items based on inspecting the peer-to-peer traffic, wherein the one shared content item is selected when the one shared content item is popular shared content, is content having a significant effect on network resources, is content with a large file size that is repeatedly transferred, and wherein the one shared content item is selected by being in a list of content licensed for active participation;

making the one shared content item available from a local server, wherein the one shared content item includes an identity of a tracker including a list of peers currently transferring portions of the one shared content item;

transmitting, by utilizing the processor, a notification to the tracker that a peer server has the one shared content item available for downloading;

receiving requests for the one shared content item from requesting peers;

obtaining, by utilizing the processor, requestor information based on the requests;

identifying, by utilizing the processor, the requesting peers downloading the one shared content item based on the requestor information; and redirecting, by utilizing the processor, the requesting peers to the local server based on the requesting peers downloading the one shared content item and based on the local server being in the list of peers currently transferring portions of the one shared content item.

14. The method of claim 13, wherein the requestor information includes one of a location of the requesting peer, an identity of the requesting peer, and any combination thereof.

15. The method of claim 13, further comprising determining content distribution information for the one shared content item, wherein the content distribution information includes a distribution of a plurality of requesting peers, internet protocol addresses of a plurality requesting peers, location of the plurality of requesting peers, or any combination thereof.

16. The method of claim 13, wherein the one shared content item matches a list of content provided by a content owner.

* * * * *